US009684318B2

(12) United States Patent
Carroll

(10) Patent No.: US 9,684,318 B2
(45) Date of Patent: Jun. 20, 2017

(54) LIGHTWEIGHT COMBINED DUCTWORK/PLENUMS FOR SPACE APPLICATIONS

(71) Applicant: THE BOEING COMPANY, Chicago, IL (US)

(72) Inventor: Galen Duff Carroll, Owens Cross Roads, AL (US)

(73) Assignee: THE BOEING COMPANY, Chicago, IL (US)

( * ) Notice: Subject to any disclaimer, the term of this patent is extended or adjusted under 35 U.S.C. 154(b) by 299 days.

(21) Appl. No.: 14/522,020

(22) Filed: Oct. 23, 2014

(65) Prior Publication Data

US 2016/0116923 A1 Apr. 28, 2016

(51) Int. Cl.
*G05D 23/19* (2006.01)
*B64G 1/00* (2006.01)
*B64G 1/40* (2006.01)
*G05D 23/08* (2006.01)

(52) U.S. Cl.
CPC ......... *G05D 23/1919* (2013.01); *B64G 1/002* (2013.01); *B64G 1/40* (2013.01); *G05D 23/08* (2013.01); *Y10T 137/7737* (2015.04)

(58) Field of Classification Search
CPC .......... B64G 1/002; B64G 1/40; G05D 23/08; G05D 23/1919; Y10T 137/7737
USPC ........................................ 137/468; 236/49.3
See application file for complete search history.

(56) References Cited

U.S. PATENT DOCUMENTS

| 4,147,298 | A | * | 4/1979 | Leemhuis | G05D 7/03 137/499 |
| 4,186,876 | A | * | 2/1980 | Clark | F24F 11/04 137/468 |
| 4,500,034 | A | * | 2/1985 | Reese | F24F 11/053 165/205 |
| 4,890,666 | A | * | 1/1990 | Clark | F24F 11/0009 165/208 |
| 5,161,578 | A | * | 11/1992 | Dreibelbis | F16K 31/086 137/625.44 |
| 5,168,894 | A | * | 12/1992 | Desmarais | F24F 13/072 137/486 |
| 5,423,479 | A | * | 6/1995 | Nichols | G05D 23/1919 236/49.3 |

(Continued)

OTHER PUBLICATIONS http://www.ductsox.com/products/open-ceiling-architecture/skelecore-fts-0; dated Aug. 28, 2013; 3 pages.

(Continued)

*Primary Examiner* — William McCalister
(74) *Attorney, Agent, or Firm* — Marshall, Gerstein & Borun LLP

(57) ABSTRACT

A gas distribution system is provided for use in an enclosed volume. This system includes a distribution duct and a first inflatable duct portion in fluid communication with the distribution duct. A passageway is provided defining an opening which extends through the passageway wherein the opening is in fluid communication with the first inflatable duct portion and wherein a cross-sectional area of the opening is less than a cross-sectional area of the first inflatable duct portion. Additionally, an inflatable enclosure is provided which is in fluid communication with the opening of the passageway wherein the inflatable enclosure is configured to form a volume within and separated from the enclosed volume.

20 Claims, 4 Drawing Sheets

(56) References Cited

U.S. PATENT DOCUMENTS

2011/0268816 A1* 11/2011 DeBoer .................. B64G 1/002
       424/613
2012/0227374 A1* 9/2012 Zegler ....................... F02K 9/44
       60/204

OTHER PUBLICATIONS http://www.globalindustrial.com/c/hvac/ventilation/fabric-duct; dated Aug. 28, 2013; 3 pages.
http://greengrotech.com/ac-systems/accessories/fabric-duct; dated Aug. 28, 2013; 2 pages.
htpp://www.jandbaviation.com/products/Pca/index.php; dated Aug. 28, 2013; 1 page.
http://www.smarthome.com/307107/Suncourt-ZO106-6-Inch-Diameter-Normally-Open-Electronic-HVAC-Air-Duct-Damper-with-Power-Supply/p.aspx; dated Aug. 28, 2013; 5 pages.
http://www.klima.co.th/new/en/installation/62-type-2-wingrail-round-fabric-duct-equipped-withfasttrack.html; dated Aug. 28, 2013; 1 page.

* cited by examiner

LIGHTWEIGHT COMBINED DUCTWORK/PLENUMS FOR SPACE APPLICATIONS

FIELD

This invention relates to an air distribution system for conditioned air, and more particularly, to plenum systems for distributing conditioned air from a main duct within an enclosed volume space.

BACKGROUND

In prelaunch preparation of a spacecraft, the filling of the fuel tanks for a rocket engine of the spacecraft presents environmental conditions within the spacecraft that are monitored and adjusted prior to launch. The fuel components for the rocket engines are typically filled into separate tanks within the spacecraft in a liquid state. In a liquid state these fuel components are kept at an extremely low temperature. As a result, the filling of the fuel tanks within the confines of the spacecraft provide a cooling effect to the ambient volume surrounding the tanks which hold these liquid fuel components.

In the instance of liquid oxygen, at one atmosphere, its temperature can be approximately minus two hundred and ninety three degrees Fahrenheit (−293° F.) (−180.5° C.). In the instance of liquid hydrogen, at one atmosphere, its temperature can be approximately minus four hundred and twenty three degrees Fahrenheit (−423° F.) (−253° C.). With the fuel tanks holding these liquid fuel components, the surrounding ambient volume temperature within the confines of the spacecraft can reach temperatures of approximately minus forty degrees below zero Fahrenheit (−40° F.) (−40° C.). This temperature within the enclosed volume of the spacecraft can affect the performance of avionic equipment and mechanical equipment positioned in the vicinity of the fuel tanks. For example, lithium ion batteries to optimally function should be maintained at a temperature of at least plus forty degrees Fahrenheit (+40° F.) (4.44° C.). Similarly, such temperatures could also affect the performance of mechanical equipment such as valves, positioned within the vicinity of the fuel tanks. In current efforts to control the temperature proximate to the equipment located within the enclosed volume, conditioned purge gas is released from the distribution duct into the enclosed volume, raising the temperature within the entire closed volume. As a result, energy is consumed to elevate the temperature in the vicinity of the avionic and mechanical equipment prior to launch.

Additionally, the fueling process can cause fumes from the liquid fuel components to enter the enclosed volume within the spacecraft. These fumes can flow within the enclosed volume to be in proximity to avionic and mechanical equipment and are preferably removed prior to launch.

In an attempt to raise the temperature and adjust the fuel fume content within the enclosed volume within the spacecraft prior to launch, purge gas such as nitrogen gas has been used to purge the enclosed volume of the spacecraft of the fuel fumes. The nitrogen gas is introduced at a temperature of approximately plus sixty degrees Fahrenheit (+60° F.) (15.55° C.) in an attempt to counter the cooling effect of the temperature within the enclosed volume caused by the low temperature liquid fuel components contained within the fuel tanks. The purge gas originates from a duct carrying the pressurized purge gas and is released into the enclosed volume within the spacecraft. With the introduction of the purge gas into the enclosed volume, the fumes can be purged, however, this higher temperature of the purge gas also contacts the fuel component tanks.

To carry larger payloads into space, larger rocket engines will be used that will have larger fuel tanks. As fuel tanks for spacecraft are designed to be larger, obtaining a uniform desired temperature of the atmosphere within the enclosed volume within the spacecraft can be more difficult than in smaller spacecraft with smaller fuel tanks and smaller enclosed volumes. As a result, warming the avionic equipment and mechanical equipment to a desired operational temperature will become more difficult to attain without introducing larger volumes of conditioned nitrogen gas, for example, into the enclosed volume of the spacecraft. The nitrogen gas will then, in turn, come into contact with the fuel component tanks and tend to elevate the temperature of these tanks.

As mentioned above, the current method employed is to introduce conditioned purge gas within the enclosed volume of the spacecraft to purge the fumes of the fuel components and to warm the entire bay or enclosed volume of the spacecraft which contains the avionic and/or mechanical equipment. To mitigate the effects of the conditioned purge gas raising the temperature at the fuel tanks, use of traditional duct work to carry the purge to closer proximity to the equipment would be too bulky and would add additional weight to the spacecraft. Introduction of individual heating units for each set up of avionic or mechanical equipment would also add additional weight and complexity to the spacecraft. Moreover, the heater(s) would draw power that could be otherwise used for other functions. Also, contemplating directing a jet stream of conditioned purge air toward the equipment is also problematic. Avionic and mechanical equipment are typically much smaller than a fuel tank, making it difficult to target and direct a jet stream to reach and sufficiently warm the equipment. Additionally, the jet stream of purge dissipates as it travels a distance through an enclosed volume before reaching the target of the avionic or mechanical equipment. As a result, the jet stream approach does not assure sufficient elevation of the temperature of the equipment for optimum operation.

SUMMARY

An example of a gas distribution system for use in an enclosed volume includes a distribution duct and a first inflatable duct portion in fluid communication with the distribution duct. A passageway is provided which defines an opening which extends through the passageway, wherein the opening is in fluid communication with the first inflatable duct portion and wherein a cross-sectional area of the opening is less than a cross-sectional area of the first inflatable duct portion. Additionally, an inflatable enclosure is provided which is in fluid communication with the opening of the passageway wherein the inflatable enclosure is configured to form a volume within and separated from the enclosed volume.

An example of a gas distribution system for use in an enclosed volume includes a distribution duct. A first inflatable duct portion is in fluid communication with the distribution duct. The system further includes a motorized valve defining an opening and including a valve flapper in fluid communication with the first inflatable duct portion. An inflatable enclosure is positioned downstream from and in fluid communication with the motorized valve wherein the inflatable enclosure is configured to define a volume within and separated from the enclosed volume. Also included is a temperature sensor positioned within the inflatable enclosure. A controller is connected to the temperature sensor and to the motorized valve such that the controller receives temperature data from the temperature sensor and the controller sends commands to the motorized valve to move the valve flapper.

The features, functions, and advantages that have been discussed can be achieved independently in various embodiments or may be combined in yet other embodiments further details of which can be seen with reference to the following description and drawings.

DESCRIPTION

Figure 1:
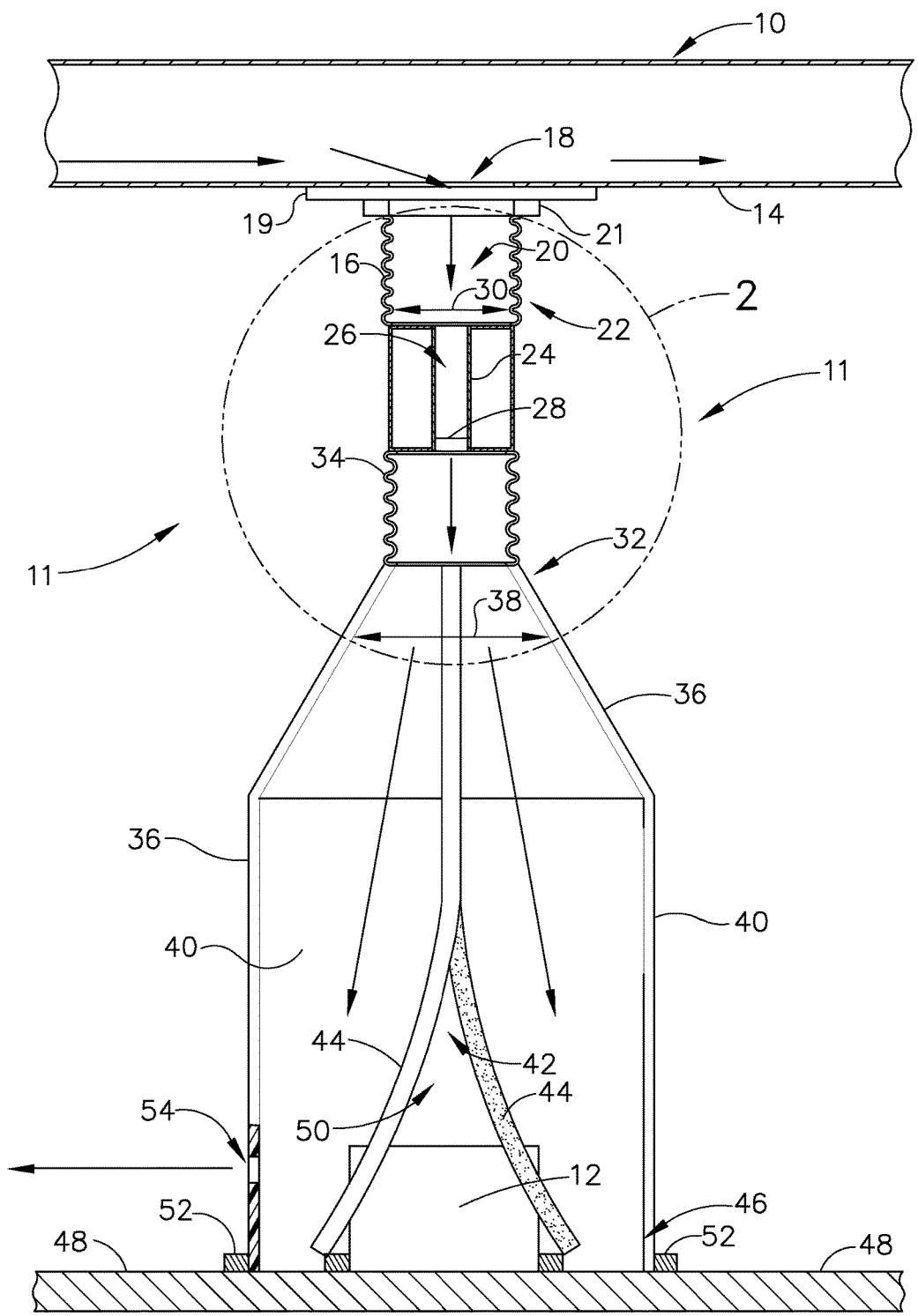
FIG. 1 is a partial cross section front elevation schematic view of an embodiment of a gas distribution system.

In referring to FIG. 1, gas distribution system 10 is typically to be used within an enclosed volume 11, such as a spacecraft or other enclosed spaces. The embodiment of distribution system 10 shown in FIG. 1, is a passive system which operates without the use of electronic controllers for controlling the flow of conditioned purge gas flowing through system 10.

In this example, as shown in FIG. 1, equipment 12 is positioned within an enclosed volume 11 of a spacecraft where equipment 12 optimally performs its tasks with properly conditioned air surrounding equipment 12 prior to launch. In particular, in this example, the conditioning involves at least two parameters. A first parameter is the mass flow rate/volume/etc. of air being purged of combustible fumes which may have entered the enclosed volume 11 of the spacecraft during fueling. This gas or fume content may include oxygen and hydrogen. A second parameter is optimal operating temperatures for equipment 12 which are positioned within enclosed volume 11 that is exposed to fuel tanks also positioned within enclosed volume 11 containing liquid fuel components.

The liquid oxygen is stored in the fuel tanks (not shown) of the spacecraft at approximately minus two hundred and ninety degrees Fahrenheit (−293° F.) (−180.6° C.) and the liquid hydrogen is stored in the fuel tanks (not shown) at approximately minus four hundred and twenty three degrees Fahrenheit (−423° F.) (−253° C.). With the enclosed volume 11 exposed to these tanks, the temperature within enclosed volume 11 can reach minus forty degrees Fahrenheit (−40° F.) (−40° C.). Temperatures at this level within enclosed volume 11 can affect the optimal operation of equipment 12, such as avionics or mechanical systems. Thus, purging the fumes originating from these fuel components from the proximity of equipment 12 and providing warmer temperature conditions surrounding equipment 12 are both desired to adjust environmental conditions (e.g. mixture of gas, temperature of gas) and to provide optimal operation of equipment 12 prior to launch of the spacecraft.

Gas distribution system 10 includes distribution duct 14. Distribution duct 14 is, in this example, a solidly constructed duct which extends through an interior volume of the spacecraft, such as enclosed volume 11. Distribution duct 14 contains/channels temperature conditioned purge gas, typically an inert gas, such as, in this example, nitrogen gas. The arrows, as seen in FIG. 1, represent the flow of this conditioned purge gas. The nitrogen gas is contained/channeled, for example, within duct 14 at a pressure of approximately one to two pounds per square inch (1 to 2 psi) (6874.75 to 13,789.51 newton/square meter ($N/m^2$). The temperature of the purge nitrogen gas, in this example, is approximately eighty five to ninety five degrees Fahrenheit (85 to 95° F.) (29.44 to 35° C.). The pressure and temperature of the purge gas contained/channeled by distribution duct 14 can be selected as needed for a particular spacecraft's mission.

First inflatable duct portion 16 is in fluid communication with distribution duct 14 at an opening 18. The purge gas enters first inflatable duct portion 16 through opening 18 defined by duct 14. Opening 18 has a fixed cross-sectional area determined by engineering simulation to provide free flow of purge gas into first inflatable duct 16. First inflatable duct portion 16 has a lightweight flexible construction compared to the construction of distribution duct 14, which may be constructed of metal or a solid composite material, or the like. First inflatable duct portion 16, in this example, is constructed of a lightweight flexible material, such as, plastic, fabric, sail cloth, or the like. First inflatable duct portion 16, in this embodiment, is secured to distribution duct 14 with clamping an end portion (not shown) of duct portion 16 between collar 19 and flange 21. Collar 19 is secured to duct 14 by any suitable method, such as bolting or welding. Flange 21 is then bolted, bonded or welded to collar 19 with first inflatable duct portion 16 positioned between collar 19 and flange 21. Other securement arrangements can be used, such as, the arrangement shown in FIG. 4, which will be discussed in more detail herein below.

Purge gas flows through opening 20, which is defined by and extends through first inflatable duct portion 16. The pressure of purge gas within distribution duct 14 forces the purge gas through first inflatable duct portion 16. Passageway 24 is positioned at end portion 22 of duct portion 16. Passageway 24 defines an opening 26 that extends through passageway 24 and is in fluid communication with first inflatable duct portion 16.

The shape, length and width for passageway 24 can be selected from various shapes, lengths and widths. Passageway 24 may be constructed of a material selected from a wide selection of materials. Passageway 24 can be made of rigid material, such as metal, plastic, composite or the like, or in contrast, be made of a flexible material much the same as that of first inflatable duct portion 16 which is constructed, as mentioned above, of plastic, fabric, sail cloth or the like. Passageway 24 can take on the configuration of a tubular construction, for example, having a cross-sectional shape selected from a variety of shapes and selected from a variety of lengths such as a thin orifice passageway 24 to a longer tubular construction as shown as passageway 24 in FIG. 1. Passageway 24 may be constructed separately from first inflatable duct portion 16 or may be a continuous construction and be integrally constructed with first inflatable duct portion 16. Regardless of the construction of passageway 24, opening 26 defined by passageway 24 has a cross-sectional area, indicated at line 28, which is smaller than a cross-sectional area of first inflatable duct portion 16, indicated at line 30. This constriction in cross-sectional area of passageway 24 indicated by line 28 reduces the flow rate of the purge gas flowing into inflatable enclosure 32, reduces the pressure in inflatable enclosure 32, and controls the temperature within inflatable enclosure 32. As seen in FIG. 1, opening 26 is in fluid communication with inflatable duct 16.

The cross-sectional area 30 of first inflatable duct 16, in this example, is approximately nineteen square inches (19 in$^r$) (0.12 m$^2$) and the cross-sectional area 28 of opening 26 is approximately four square inches (4 in$^r$) (0.0025 m$^2$). The size of the area of cross-sectional area 28 of opening 26 of passageway 24 is predetermined or pre-calculated prior to the installation of gas distribution system 10. The dimension is determined so as to provide a desired flow rate of the conditioned purge gas through opening 26. In the process of making this determination, the user will understand the temperature that will be present in enclosed volume 11, for example, minus forty degrees Fahrenheit (−40° F.) (−40° C.), the temperature of the purge gas, as mentioned above in this embodiment will be approximately plus eighty five to ninety five degrees Fahrenheit (85 to 95° F.) (29.4 to 35° C.) and a pressure of the purge gas of one to two pounds per square inch (1 to 2 psi) (6874.75 to 13,789.51 N/m$^2$) within distribution duct 14.

Equipment 12, in this example, that will be positioned within inflatable enclosure 32 includes avionic electronics and pump equipment. Equipment 12 operates, for example, at approximately plus forty degrees Fahrenheit (40° F.) (4.4° C.). The user will understand the desired outflow rate of purge gas from volume 50 through opening or orifice 54 of inflatable enclosure 32. The desired outflow rate is dependent on the desired temperature to be maintained within volume 50. Area of opening or orifice 54 will be approximately three square inches (3 in$^2$) (0.0019 m$^2$), in this embodiment, to maintain volume 50 pressure of approximately 0.2 to 0.5 lbs/in$^2$ (1378.9 to 3447.4 N/m$^2$). For this example, cross-sectional areas for opening 26 and opening 54 have been determined by engineered flow rate simulations and temperature calculations. All cross-sectional area sizes of openings are determined from engineering simulations and temperature calculations to determine optimal temperature control of volume 50. Opening 26 has a cross-sectional area 28 of four square inches (4 in$^2$) (0.0025 m$^2$) for this embodiment that is determined to provide the proper flow rate of purge gas into inflatable enclosure 32 to maintain the desired operating temperature for equipment 12. Should parameters change, such as the temperature of enclosed volume 11 or the optimal temperature of operation of equipment 12, the cross-sectional area 28 of opening 26 can be selected at time of fabrication by engineering simulation accordingly to obtain the optimal temperature downstream within inflatable enclosure 32. A larger cross-sectional area 28 would provide a larger volume of conditioned purge gas for inflatable enclosure 32, and a smaller cross-sectional area 28 would provide a smaller volume of conditioned purge gas for inflatable enclosure 32 to maintain the operational temperature for equipment 12.

Proceeding downstream from passageway 24, inflatable enclosure 32 is in fluid communication with opening 26 of passageway 24. In this embodiment, inflatable enclosure 32 is constructed of second inflatable duct portion 34 and inflatable plenum portion 36. Second inflatable duct portion 34 is in fluid communication with opening 26 and in fluid communication downstream of inflatable plenum portion 36. Second inflatable duct portion 34 and inflatable plenum portion 36 are constructed of a flexible material. Second inflatable duct portion 34 and inflatable plenum 36 can be made of plastic, fabric, or the like. In some embodiments, inflatable duct portion 16, passageway 24, second inflatable duct portion 34, and inflatable plenum portion 36 can be separate components connected together, could be made as a single integral unit, or constructed as a combination of separate components and integral components.

Cross-sectional area, as indicated by line 38, of inflatable enclosure 32, in this embodiment, is larger than cross-sectional area 28 of opening 26 of passageway 24. Inflatable enclosure 32 downstream from passageway 24 is configured from a geometric shape to be able to surround equipment 12 by being constructed of sufficient size and shape to extend from passageway 24 to surface 48 and surround equipment 12. With equipment 12 enclosed within volume 50 defined by inflatable enclosure 32, equipment 12 receives the conditioned purge gas channeled from distribution duct 14, and equipment 12 is separated from direct contact with colder temperatures and fuel fumes within enclosed volume 11.

Inflatable plenum portion 36 includes a sidewall 40 having a slit 42. Slit 42 provides access to inner volume 50 within inflatable enclosure 32 providing access to equipment 12. Slit 42 is secured closed with securement member 44 that is positioned on sidewall 40 along opposing sides of slit 42. Securement member 44 opens to provide access within inflatable plenum portion 36 and secures closed slit 42 with distribution system 10 in operation. In this embodiment, securement member 44 includes a zipper. In other embodiments, securement member 44 includes releasable engaging hook and loop panel assembly. One panel of the assembly carries hooks positioned on sidewall 40 on one side of slit 42, and another panel carries loops positioned on sidewall 40 on an opposing side of slit 42. Securement member 44 provides ease of access into inflatable plenum portion 36 and ease in securing inflatable plenum portion 36 closed for operation.

Sidewall 40 of the inflatable plenum portion 36 includes an end portion 46 having a sufficient length to surround equipment 12. Sidewall 40 encloses equipment 12 within inflatable plenum portion 36 with end portion 46 being secured to surface 48 within the spacecraft around equipment 12, thereby positioning equipment 12 within volume 50. End portion 46 is secured to surface 48, in this example, with clamping end portion 46 against surface 48 with bolting flange 52 onto surface 48 with end portion positioned between flange 52 and surface 48 (not shown).

Orifice or opening 54 is secured through sidewall 40 of inflatable plenum 36. In this embodiment, the cross-sectional area of opening 54 is approximately three square inches (3 in$^2$) (0.0019 m$^2$) which will maintain the pressure within volume 50 at approximately 0.2 to 0.5 psi (1378.9 to 3447.4 N/m$^2$), as mentioned above. Alternatively, a pressure-activated vent such as a bellows-activated valve can be used at opening 54 such that the vent will open when a threshold pressure is attained and closed when the pressure drops to a predetermined level for that vent.

The method employed with distribution system 10 includes channeling the conditioned purge gas through distribution duct 14. First inflatable duct portion 16 receives at least a portion of the gas from distribution duct 14. The purge gas passes downstream through opening 26 defined by passageway 24. Opening 26 has a cross-sectional area 28 that is smaller than a cross-sectional area 30 of the first inflatable duct portion 16. Cross-sectional area 28 of passageway 24 through opening 26 controls the rate of flow of the purge gas reaching inflatable enclosure 32 positioned in fluid communication with and downstream of opening 26 of passageway 24. As discussed earlier, the cross-sectional area 28 of opening 26 is predetermined prior to installation of distribution system 10. A larger cross-sectional area would permit a higher flow rate of conditioned purge gas to reach inflatable enclosure 32 and conversely a smaller cross-sectional area would reduce the flow rate of conditioned purge gas into inflatable enclosure 32. The size of the cross-sectional area is determined based on the parameters discussed above, which includes the temperature to be provided within inflatable enclosure 32, under the circumstances of operational temperature of equipment 12 and the temperature conditions presented by enclosed volume 11 by the fueling tanks.

Inflatable plenum portion 36 receives the purge gas from opening 26. Purge gas flows into inflatable plenum portion 36, which has a cross-sectional area 38 greater than cross-sectional area 28. Purge gas flows into inflatable plenum portion 36 wherein end portions 46 of sidewall 40 of inflatable plenum portion 36 are secured around equipment 12 to surface 48 within enclosed volume 11 of the spacecraft. With equipment 12 enclosed within volume 50 of inflatable plenum portion 36, conditioned purge gas surrounds equipment 12 preventing fuel fumes and other gases from contacting equipment 12 within enclosed volume 50 and maintaining equipment 12 within its intended operational temperatures.

Figure 2:
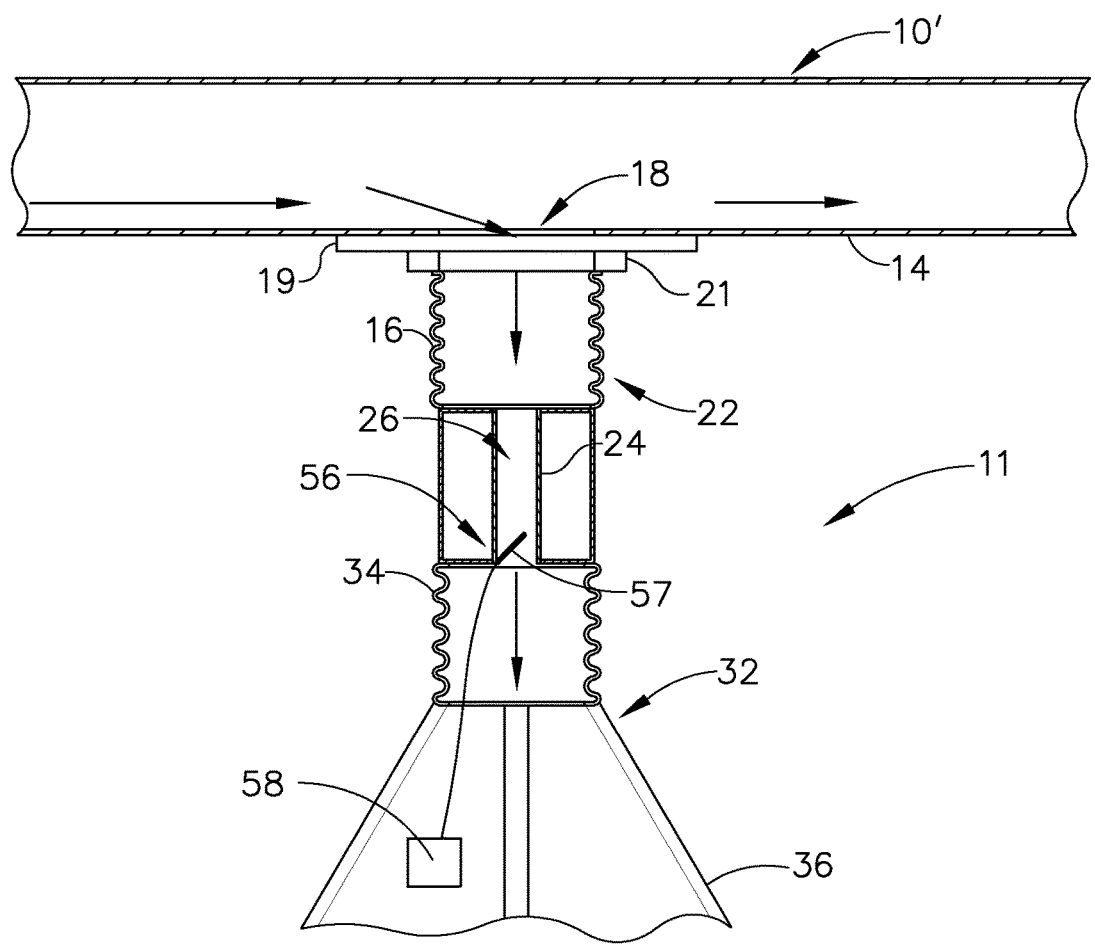
FIG. 2 is a partial cross section front elevation schematic view of another embodiment of the gas distribution system of the portion encircled in FIG. 1 and designated as 2.

A first alternative embodiment of the passive distribution system 10' can be seen in FIG. 2. This embodiment differs from the embodiment shown in FIG. 1 in that system 10' has a passive controller, while system 10 is a passive system without a controller. For example, system 10' includes a passive mechanical controller. Components in this first alternative embodiment in FIG. 2 that are the same components as used in the embodiment in FIG. 1, have the same component number as that component set forth in FIG. 1. In this embodiment, a valve 56 is positioned between first inflatable duct portion 16 and inflatable enclosure 32 within opening 26 of passageway 24. For this example, valve 56 has flapper 57 positioned within opening 26 of passageway 24 such that flapper 57 is capable of opening and closing opening 26. In this embodiment, opening 26 does not have a fixed cross-sectional area. Valve 56 has flapper 57, and valve 56 includes a bi-metal temperature sensing member 58 that is exposed to volume 50 within inflatable enclosure 32. The bi-metal temperature sensing member 58 employed in this example includes coiled bi-metallic elements that control the movement of flapper 57 and thereby the air flow through opening 26. The bi-metal sensing member 58 comprises two metals wherein a first metal component contracts and expands faster than the second metal component when exposed to different temperatures. Thus, for example, at a lower temperature the first metal component contracts more quickly than the second metal component causing movement of the first metal component relative to the second metal component. That movement causes flapper 57 of valve 56 to move to a more open position with respect to opening 26, permitting a larger amount of purge gas to reach inflatable plenum portion 36 of inflatable enclosure 32. Thus, as the temperature decreases within volume 50, flapper 57 will move to be less obstructive to opening 26, allowing more conditioned purge gas to reach equipment 12. As the temperature increases within volume 50, flapper 57 of valve 56 will move to a more closed or obstructed position relative to opening 26 allowing less purge gas to reach equipment 12.

Figure 3:
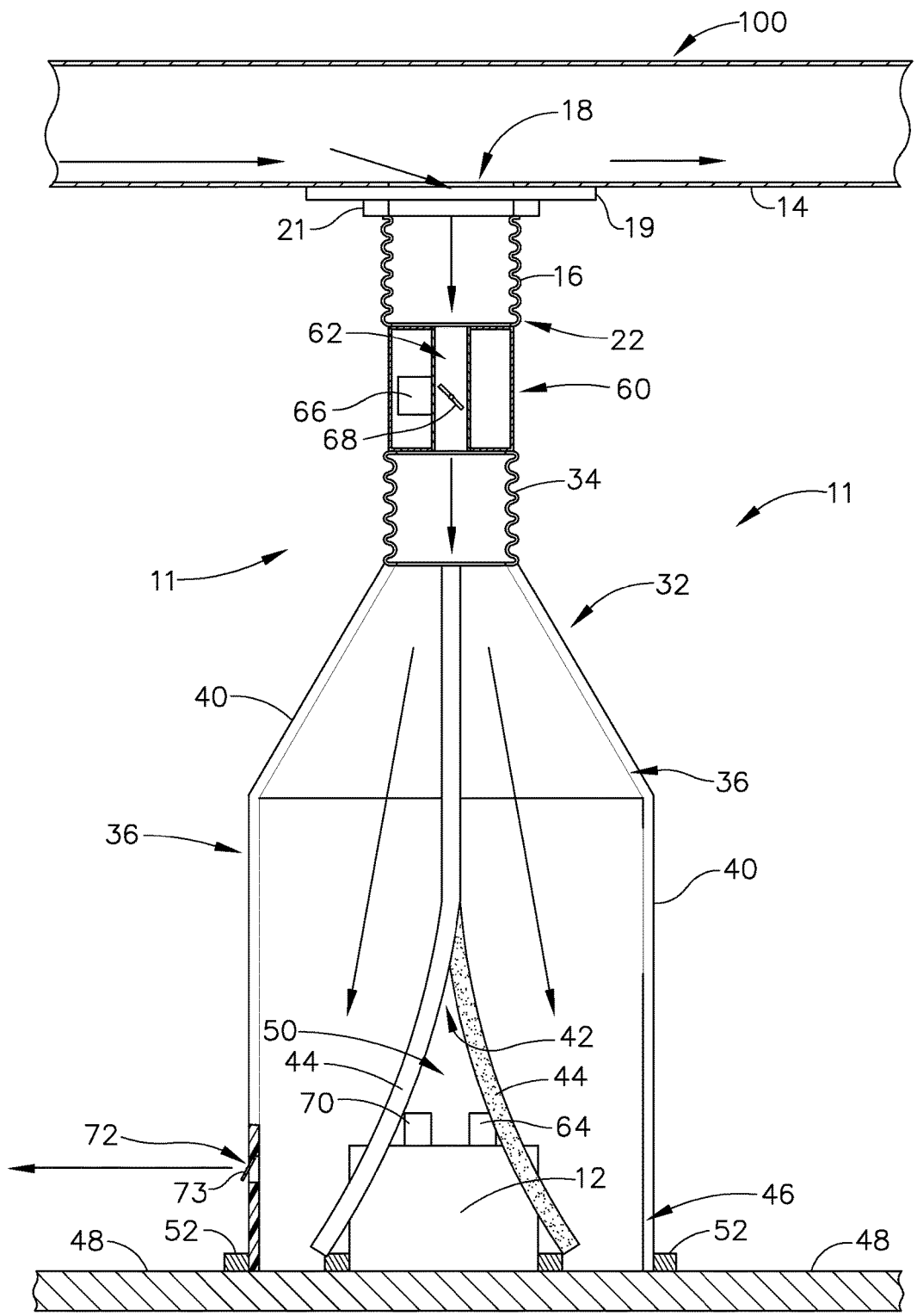
FIG. 3 is a partial cross section front elevation schematic view of another embodiment of the gas distribution system.

Now referring to FIG. 3, a second alternative embodiment of gas distribution system 100 is shown. This distribution system 100, in contrast to the passive system 10 shown in FIG. 1 and passive system 10' shown in FIG. 2, is an active system wherein the flow of the conditioned purge gas to equipment 12 within volume 50 is controlled with use of an electronic controller. Many of the components described for gas distribution system 10 shown in FIG. 1 will be the same components for this active gas distribution system 100, shown in FIG. 3. As a result, the same components used in active system 100 will be numbered in FIG. 3 with the same component identification numbers as set forth in the description above for passive system 10, as shown in FIG. 1.

In the embodiment shown in FIG. 3, purge gas flows from distribution duct 14, which is in fluid communication with first inflatable duct portion 16, into first inflatable duct portion 16. A motorized valve 60 defines an opening 62, which is in fluid communication with first inflatable duct portion 16. Inflatable enclosure 32 is positioned downstream from and is in fluid communication with opening 62 of motorized valve 60. Motorized valve 60 includes a valve flapper 68 positioned with respect to opening 62 such that flapper 68 maintains opening 62 in an open position or being less obstructive to opening 62. Flapper 68 is capable of closing opening 62 or being more obstructive to opening 62. In this embodiment, inflatable enclosure 32 includes second inflatable duct portion 34 in fluid communication with and downstream of opening 62 of motorized valve 60. Inflatable plenum portion 36 of inflatable enclosure 32 is connected to, downstream from, and in fluid communication with second inflatable duct portion 34.

Inflatable plenum portion 36 of inflatable enclosure 32 is configured to enclose a sufficient volume to extend from second inflatable duct 34 to surface 48 to surround equipment 12 and to secure end portion 46 of sidewall 40 to surface 48. Inflatable enclosure 32 defines volume 50 within and providing separation from enclosed volume 11. With equipment 12 positioned within volume 50, equipment 12 does not contact the ambient air and fuel fumes within enclosed volume 11, thereby being in the desired environment using the conditioned purge gas from distribution duct 14.

Temperature sensor 64, in this embodiment, is positioned within volume 50 of inflatable enclosure 32 and configured to sense the temperature within inflatable enclosure 32 proximate to equipment 12. Controller 66 is connected to temperature sensor 64 and to the motorized valve 60 such that controller 66 receives temperature data from temperature sensor 64. Controller 66 sends commands to motorized valve 60 to move valve flapper 68 to adjust flapper 68 to be more or less obstructive with respect to opening 62 in accordance with the temperature data controller 66 received.

Controller 66 includes a memory for storing algorithms that are executed by a processor so as to receive temperature data from temperature sensor 64, such as, for example, a thermocouple, RTD (resistive thermal device), solid state devices, or thermistor may be used in this embodiment. The processor compares the received temperature data to a selected target temperature set point of volume 50 within which equipment 12 is positioned. In the alternative, the processor compares the received temperature to a target temperature range between two temperature set points. If the temperature data received by controller 66 indicates that the temperature within volume 50 is greater than the target temperature set point for volume 50 or greater than the target temperature range for volume 50, in this example, motorized valve 60 will be commanded to move valve flapper 68 to reduce the area of opening 62 by moving valve flapper 68 into a more closed or obstructive position. By reducing the area of opening 62, the flow rate of conditioned purge gas flowing from first inflatable duct portion 16 into inflatable enclosure 32 is reduced. In this embodiment, the reduction of the flow rate of purge gas will allow the temperature within enclosed volume 11 to lower the temperature within volume 50 closer to the target temperature.

If the temperature data received from temperature sensor 64 indicates that the temperature within volume 50 is less than the target temperature set point for volume 50 or less than the target temperature range for volume 50, controller 66 will move valve flapper 68 to a more open position or less obstructive position with respect to opening 62 to permit a higher flow rate of conditioned purge gas to pass from first inflatable duct portion 16 into inflatable enclosure 32. This increased flow rate of conditioned purge gas will, in this example, raise the temperature within volume 50 to counter the cooling effects of the air of enclosed volume 11 imparts on volume 50. Controller 66 operates to maintain the temperature within inflatable enclosure 32 at or near the target temperature to provide optimal operating temperature conditions for equipment 12. The conditioned purge gas being introduced into inflatable enclosure 32 controls the temperature within volume 50 and isolates equipment 12 from fuel fumes present within enclosed volume 11.

Controller 66 is also connected to a pressure sensor 70 which is positioned within inflatable plenum portion 36 of inflatable enclosure 32. Pressure sensor 70 can be any suitable type of pressure sensor or multiple sensors using sensing elements, such as a bridge, bellows, piezoresistive, solid state, or resistive pressure elements. Controller 66 is also connected to a motorized vent valve 72, such as a flapper valve, ball type, or iris form. Motorized vent valve 72 is positioned in sidewall 40 of inflatable plenum portion 36. Pressure sensor 70 senses the gas pressure within volume 50 within inflatable plenum portion 36 and sends the sensed gas pressure data to controller 66. Controller 66 receives the gas pressure data, and controller 66 sends commands to motorized vent valve 72 to move motorized flapper valve member 73, in accordance with the pressure data controller 66 received.

Controller 66 includes a memory for storing algorithms that are executed by a processor so as to receive gas pressure data from pressure sensor 70 and compare the gas pressure data to that of a selected target pressure set point to avoid over-pressurizing or under-pressurizing volume 50. In the alternative, the processor compares the received pressure data to a target pressure range between two pressure set points to avoid over-pressurizing or under-pressurizing volume 50. If the gas pressure data received by controller 66 indicates that the pressure within volume 50 is greater than the target pressure set point for volume 50 or greater than the target pressure range for volume 50, motorized vent valve 72 is commanded to move flapper valve member 73 to open motorized vent valve 72, releasing conditioned purge gas from volume 50 thereby reducing the pressure within volume 50. At the same time, controller 66 sends a command to motorized valve 60 to position valve flapper 68 to a more closed position within opening 62 reducing the flow of conditioned purge gas into inflatable plenum portion 36. In turn, if the gas pressure data received by controller 66 indicates that the pressure within volume 50 is less than the target pressure set point or target pressure range, motorized vent valve 72 will be commanded by controller 66 to close flapper valve member 73 or flapper valve member 73 will be maintained closed, if already closed. At that point, controller 66 will command motorized valve 60 to move valve flapper 68 to a more opened position within opening 62 to introduce more conditioned purge gas into volume 50.

The method employed with distribution system 100 includes channeling the conditioned purge gas through distribution duct 14. The method includes receiving at least a portion of the gas from distribution duct 14 into first inflatable duct portion 16, wherein the at least a portion of the gas passes downstream through opening 62 defined by a motorized valve 60 positioned within opening 62. The method also includes receiving the conditioned purge gas downstream from opening 62 of motorized valve 60 into inflatable enclosure 32. End portion 46 of inflatable enclosure 32 is secured to surface 48 within enclosed volume 11 to position equipment 12 within volume 50 of inflatable enclosure 32. Temperature sensor 64 is positioned within inflatable enclosure 32 and is connected to controller 66, and controller 66 is connected to motorized valve 60. Temperature sensor 64 senses a temperature within the inflatable enclosure 32 and sends temperature data to controller 66. In response, controller 66 sends a command to motorized valve 60 to move valve flapper 68 relative to opening 62. Other embodiments of temperature sensor 64 can be used which sense a change in temperature within volume 50, and an algorithm of controller 66 is used to interpret that temperature change data and accordingly send a command to motorized valve 60 to further increase or to further decrease the area of opening 62.

The method further utilizes pressure sensor 70 positioned within inflatable enclosure 32 and connected to controller 66 for sensing the pressure within inflatable enclosure 32. Controller 66 is connected to motorized vent valve 72. With pressure sensor 70 sensing a gas pressure within inflatable enclosure 32, the gas pressure data is sent to controller 66, and controller 66 sends a command to motorized vent valve 72 to move. Other embodiments of pressure sensor 70 can be used which sense a change in pressure within volume 50 and an algorithm of controller 66 interprets that pressure change data and accordingly send a command to motorized vent valve 72 to further open or to further close flapper valve member 73.

As shown in FIGS. 1-3 and discussed earlier, first inflatable duct 16 is secured to distribution duct 14 by securing collar 19 to distribution duct 14 and then clamping inflatable duct 16 between flange 21 and collar 19, with flange 21 secured to collar 19. This securing arrangement (e.g., flange 21 and collar 19) secures inflatable duct 16 to be in fluid communication with opening 18 of duct 14. In the alternative embodiment of a securing arrangement shown in FIGS. 4 and 5, an attachment mechanism 71 secures first inflatable duct 16 to distribution duct 14 with opening 18 of distribution duct 14 in fluid communication with first inflatable duct 16. Attachment mechanism 71 has a securement member 69 that overlies a portion 73 of the distribution duct 14, which is positioned on an opposing side of the distribution duct 14 from opening 18.

Figure 4:
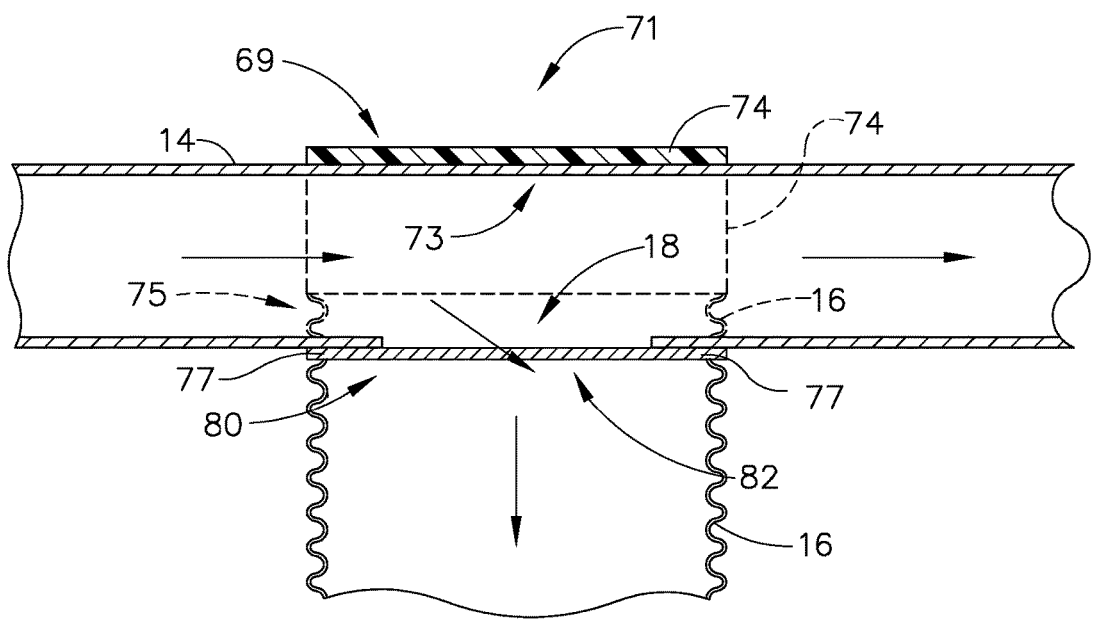
FIG. 4 is a cross section front elevation schematic view of another embodiment of the attachment mechanism connecting the inflatable duct to the distribution duct of FIG. 1.

In the embodiment shown in FIG. 4, securement member 69 includes a flap 74 secured to a first portion 75 of inflatable duct 16. In this example, first portion 75 of inflatable duct 16 includes about one-half of the perimeter of inflatable duct 16 and extends further than second portion 80, as seen in FIG. 4. First portion 75 is positioned behind distribution duct 14, and distribution duct 14 is positioned to abut second portion 80.

Figure 5:
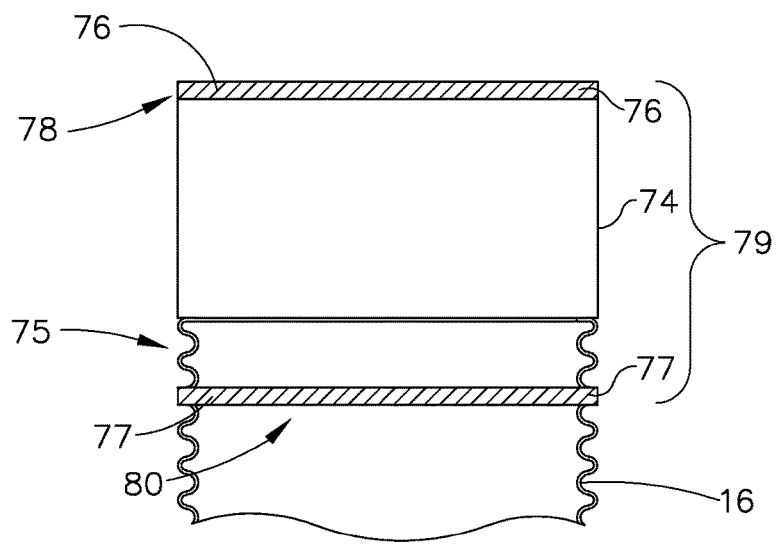
FIG. 5 is a partial plan view of the attachment mechanism of FIG. 4 disengaged from the distribution duct.

Flap 74, as seen in FIG. 5, extends from first portion 75 of first inflatable duct 16 to a sufficient length to allow flap 74 to wrap about or overlie distribution duct 14. End portion 78, as seen in FIG. 5, of flap 74 includes a first portion 76 of a fastener assembly 79. A second portion 80 of inflatable duct 16 includes a second portion 77 of fastener assembly 79. With first portion 76 of fastener assembly 79 secured to second portion 77 of fastener assembly 79, flap 74 is secured to second portion 80 of inflatable duct 16. In this example, first and second portions 76, 77 of fastener assembly 79 include two components of a zipper, wherein the zipper can be opened or closed thereby securing or releasing end portion 78 of flap 74 to second portion 80 of first inflatable duct 16. Alternatively, the first portion 76 of fastener assembly 79 can include a panel of hooks secured to end portion 78 of flap 74, and the second portion 77 of fastener assembly 79 can include a panel of loops secured to second portion 80 of first inflatable duct 16. The hooks and loops form a releasable securement of flap 74 to first inflatable duct 16.

Another example of this embodiment of securement mechanism 71 includes an end portion of the first inflatable duct 16 that is split along a length of the first inflatable duct 16 into first and second portions. The first portion of the first inflatable duct 16 is positioned to extend around the perimeter of the distribution duct 14 from one side of the distribution duct. The second portion of the first inflatable duct 16 is positioned to extend around the perimeter of the distribution duct 14 from an opposing side of the distribution duct 14. These first and second portions are secured together with a fastener assembly positioned to secure the first portion of the first inflatable duct 16 to the second portion of the first inflatable duct 16. The fastener assembly can include two components of a zipper assembly, wherein one component is positioned on the first potion of the inflatable duct 16 and the second component is positioned on the second portion of the inflatable duct 16. Alternatively, a panel of hooks can be secured to the first portion of the inflatable duct 16, and a panel of loops can be secured to the second portion of the inflatable duct 16. The hooks and loops form a releasable securement of the first and second portions of first inflatable duct 16.

While various embodiments have been described above, this disclosure is not intended to be limited thereto. Variations can be made to the disclosed embodiments that are still within the scope of the appended claims.

Further, the disclosure comprises embodiments according to the following clauses:

Clause 1 A gas distribution system for use in an enclosed volume, the system comprising; a distribution duct; a first inflatable duct portion in fluid communication with the distribution duct; a motorized valve defining an opening and a valve flapper in fluid communication with the first inflatable duct portion; an inflatable enclosure positioned downstream from and in fluid communication with the motorized valve wherein the inflatable enclosure is configured to define a volume within and separated from the enclosed volume; a temperature sensor positioned within the inflatable enclosure; and a controller connected to the temperature sensor and to the motorized valve such that the controller receives temperature data from the temperature sensor and the controller sends commands to the motorized valve to move the valve flapper, wherein the first inflatable duct portion is secured to the distribution duct with a flange clamping an end portion of the first inflatable duct portion against a collar secured to the distribution duct.

Clause 2 A gas distribution system for use in an enclosed volume, the system comprising; a distribution duct; a first inflatable duct portion in fluid communication with the distribution duct; a motorized valve defining an opening and a valve flapper in fluid communication with the first inflatable duct portion; an inflatable enclosure positioned downstream from and in fluid communication with the motorized valve wherein the inflatable enclosure is configured to define a volume within and separated from the enclosed volume; a temperature sensor positioned within the inflatable enclosure; and a controller connected to the temperature sensor and to the motorized valve such that the controller receives temperature data from the temperature sensor and the controller sends commands to the motorized valve to move the valve flapper, wherein the first inflatable duct portion is constructed of one of a flexible plastic material and a fabric.

Clause 3 A gas distribution system for use in an enclosed volume, the system comprising; a distribution duct; a first inflatable duct portion in fluid communication with the distribution duct; a motorized valve defining an opening and a valve flapper in fluid communication with the first inflatable duct portion; an inflatable enclosure positioned downstream from and in fluid communication with the motorized valve wherein the inflatable enclosure is configured to define a volume within and separated from the enclosed volume; a temperature sensor positioned within the inflatable enclosure; and a controller connected to the temperature sensor and to the motorized valve such that the controller receives temperature data from the temperature sensor and the controller sends commands to the motorized valve to move the valve flapper, wherein the inflatable enclosure comprises: second inflatable duct portion wherein the second inflatable duct portion is in fluid communication with and downstream from the motorized valve; and an inflatable plenum portion connected to the second inflatable duct portion wherein the inflatable plenum portion is in fluid communication with and downstream from the second inflatable duct portion, and wherein the inflatable plenum portion comprises a sidewall and wherein the sidewall defines a slit.

Clause 4 The gas distribution system of clause 3 wherein the sidewall of the inflatable plenum portion further includes a securement member associated with the slit, wherein the securement member opens and secures closed the slit.

Clause 5 The gas distribution system of clause 4 wherein the securement member comprises one of a zipper and releasable hook and loop releasable securement assembly.

Clause 6 A gas distribution system for use in an enclosed volume, the system comprising; a distribution duct; a first inflatable duct portion in fluid communication with the distribution duct; a motorized valve defining an opening and a valve flapper in fluid communication with the first inflatable duct portion; an inflatable enclosure positioned downstream from and in fluid communication with the motorized valve wherein the inflatable enclosure is configured to define a volume within and separated from the enclosed volume; a temperature sensor positioned within the inflatable enclosure; and a controller connected to the temperature sensor and to the motorized valve such that the controller receives temperature data from the temperature sensor and the controller sends commands to the motorized valve to move the valve flapper, wherein the inflatable enclosure comprises: second inflatable duct portion wherein the second inflatable duct portion is in fluid communication with and downstream from the motorized valve; and an inflatable plenum portion connected to the second inflatable duct portion wherein the inflatable plenum portion is in fluid communication with and downstream from the second inflatable duct portion, and wherein the sidewall of the inflatable plenum portion comprises an end portion, wherein the end portion is configured to surround equipment and enclose the equipment within the inflatable plenum portion with the end portion secured to a surface positioned within the enclosed volume.

Clause 7 A method for distributing gas within an enclosed volume, comprising the steps of: flowing the gas through a distribution duct; receiving at least a portion of the gas from the distribution duct into a first inflatable duct portion wherein: the at least a portion of the gas passes downstream through an opening defined by a passageway; the opening having a cross-sectional area smaller than a cross-sectional area of the first inflatable duct portion; and receiving the gas downstream from the opening of the passageway into an inflatable enclosure, wherein an end portion of the inflatable enclosure is secured to a surface within the enclosed volume surrounding equipment positioned within the enclosed volume and enclosing the equipment within the inflatable enclosure.

Clause 8 The method of clause 7 further comprising the inflatable enclosure defining a slit for accessing the equipment positioned within the inflatable enclosure.

Clause 9 The method of clause 7 further comprising the inflatable enclosure with an opening to permit gas contained within the inflatable enclosure to flow into the enclosed volume.

Clause 10 A method for distributing of gas within an enclosed volume, comprising the steps of: flowing the gas through a distribution duct; receiving at least a portion of the gas from the distribution duct into a first inflatable duct portion wherein: the at least a portion of the gas passes downstream through an opening defined by a motorized valve; and the motorized valve comprises a valve flapper positioned in alignment with the opening; and receiving the gas downstream from the opening of the motorized valve into an inflatable enclosure wherein: an end portion of the inflatable enclosure is secured to a surface within the enclosed volume positioning equipment within the inflatable enclosure, a temperature sensor is positioned within the inflatable enclosure and connected to a controller and the controller is connected to the motorized valve, the temperature sensor senses a temperature within the inflatable enclosure and sends that information to the controller; and the controller in response sends a command to the motorized valve to move the valve flapper relative to the opening.

Clause 11 The method of clause 10 comprising a pressure sensor positioned within the inflatable enclosure and connected to the controller, and the controller connected to a motorized vent valve associated with the inflatable enclosure, such that, with the pressure sensor sensing a gas pressure within the inflatable enclosure, the pressure sensor sends pressure data to the controller and the controller sends a command to the motorized vent valve to move.

Clause 12 The method of clause 10 comprising the inflatable enclosure defining a slit for accessing the equipment within the inflatable enclosure.

Clause 13 A gas distribution system for use in an enclosed volume, the system comprising; a distribution duct; a first inflatable duct portion in fluid communication with the distribution duct; a passageway defining an opening which extends through the passageway wherein the opening is in fluid communication with the first inflatable duct portion, and wherein a cross-sectional area of the opening is less than a cross-sectional area of the first inflatable duct portion; and an inflatable enclosure in fluid communication with the opening of the passageway wherein the inflatable enclosure is configured to form a volume within and separated from the enclosed volume, further comprising: an opening defined in the distribution duct; and an attachment mechanism which secures the first inflatable duct to the distribution duct, positioning the first inflatable duct in fluid communication with the opening of the distribution duct, wherein; the attachment mechanism has a securement mechanism that overlies a portion of the distribution duct positioned on an opposing side of the distribution duct from the opening, wherein the securement mechanism comprises: an end portion of the first inflatable duct split along a length of the first inflatable duct wherein the perimeter of the first inflatable duct is separated into a first and a second portion; a fastener assembly positioned to secure the first portion of the first inflatable duct to the second portion of the first inflatable duct, wherein: the first portion of the first inflatable duct is positioned to extend around the perimeter of the distribution duct from one side of the distribution duct, and the second portion of the first inflatable duct is positioned to extend around the perimeter of the distribution duct from an opposing side of the distribution duct.

What is claimed:

1. A gas distribution system for use in an enclosed volume, the system comprising:
   a distribution duct;
   a first inflatable duct portion in fluid communication with the distribution duct;
   a motorized valve defining an opening and including a valve flapper in fluid communication with the inflatable duct portion;
   an inflatable enclosure positioned downstream from and in fluid communication with the motorized valve, wherein the inflatable enclosure is configured to define a volume within and separated from the enclosed volume;
   a temperature sensor positioned within the inflatable enclosure; and
   a controller connected to the temperature sensor and to the motorized valve such that the controller receives temperature data from the temperature sensor and the controller sends commands to the motorized valve to move the valve flapper.

2. The gas distribution system of claim 1 wherein the inflatable duct portion is secured to the distribution duct with an end portion of the inflatable duct portion positioned between a collar secured to the distribution duct and a flange secured to the collar.

3. The gas distribution system of claim 1 comprising:
   an opening defined in the distribution duct; and
   an attachment mechanism that secures the first inflatable duct to the distribution duct, with the opening of the distribution duct in fluid communication with the first inflatable duct, the attachment mechanism has a securement mechanism that overlies a portion of the distribution duct positioned on an opposing side of the distribution duct from the opening.

4. The gas distribution system of claim 3 wherein the securement mechanism comprises a flap secured to and extending from a first portion of the first inflatable duct.

5. The gas distribution system of claim 4 wherein:
   the flap has an end portion including a first portion of a fastener assembly; and
   a second portion of the first inflatable duct includes a second portion of the fastener assembly, wherein with the flap overlying the distribution duct and with the first portion of the fastener assembly secured to the second portion of the fastener assembly, the first inflatable duct is secured to the distribution duct.

6. The gas distribution system of claim 1 wherein the inflatable enclosure comprising:
   a second inflatable duct portion that is in fluid communication with and downstream from the motorized valve; and
   an inflatable plenum portion connected to the second inflatable duct portion, wherein the inflatable plenum portion is in fluid communication with and downstream from the second inflatable duct portion.

7. The gas distribution system of claim 6 wherein the inflatable plenum portion further including:
- a motorized vent valve secured to a sidewall of the inflatable plenum, wherein the motorized vent valve is connected to the controller; and
- a pressure sensor positioned within the inflatable plenum portion and connected to the controller, such that, the pressure sensor senses a pressure within the inflatable plenum and sends gas pressure data to the controller, and the controller sends a command to the motorized vent valve to move a flapper valve member.

8. The gas distribution system of claim 7 wherein the pressure sensor includes one of a bridge, bellows, piezoresistive, solid state or resistive pressure element.

9. The gas distribution system of claim 7 wherein when the pressure sensor senses a pressure greater than a target pressure within the inflatable plenum the controller sends a command to the motorized vent valve to move the flapper valve member releasing a purge gas from the inflatable plenum and reducing pressure within the inflatable plenum.

10. The gas distribution system of claim 9 wherein when the controller sends the command to the motorized vent valve to move the flapper valve member releasing the purge gas from the inflatable plenum and reducing pressure within the inflatable plenum, the controller sends a command to the motorized valve to position the valve flapper to a position reducing the flow of purge gas into the inflatable plenum.

11. The gas distribution system of claim 7 wherein when the pressure sensor senses a pressure less than a target pressure within the inflatable plenum the controller sends a command to the motorized vent valve to move the flapper valve member to a closed position.

12. The gas distribution system of claim 11 wherein when the controller sends a command to the motorized vent valve to move the flapper valve member to a closed position, the controller sends a command to the motorized valve to position the valve flapper to a position increasing the flow of purge gas into the inflatable plenum.

13. The gas distribution system of claim 6 wherein the inflatable enclosure plenum portion comprises a sidewall, and wherein the sidewall defines a slit.

14. The gas distribution system of claim 13 wherein the sidewall of the inflatable plenum portion comprises a securement member associated with the slit.

15. The gas distribution system of claim 14 wherein the securement member comprises a zipper.

16. The gas distribution system of claim 14 wherein the securement member comprises a releasable engaging hook and loop panel assembly.

17. The gas distribution system of claim 13 wherein the sidewall comprises an end portion, and wherein the end portion is configured to surround equipment and enclose the equipment within the inflatable plenum portion when the end portion is secured to a surface positioned within the enclosed volume.

18. The gas distribution system of claim 6 wherein:
- the first inflatable duct portion is constructed of one of plastic or a fabric;
- the second inflatable duct portion is constructed of one of a plastic or a fabric; and
- the inflatable plenum is constructed of one of plastic or a fabric.

19. The gas distribution system of claim 1 wherein when the temperature sensor senses a temperature greater than a target temperature the controller sends a command to the motorized valve to move the valve flapper to reduce a flow rate of a purge gas from the first inflatable duct portion into the inflatable enclosure.

20. The gas distribution system of claim 1 wherein when the temperature sensor senses a temperature less than a target temperature the controller sends a command to the motorized valve to move the valve flapper to increase a flow rate of a purge gas from the first inflatable duct portion into the inflatable enclosure.

* * * * *